Sept. 18, 1962 L. R. CORVISIER 3,054,417
APPARATUS FOR MIXING LIQUIDS IN A CONSTANT PROPORTION
Filed May 6, 1957 6 Sheets-Sheet 1
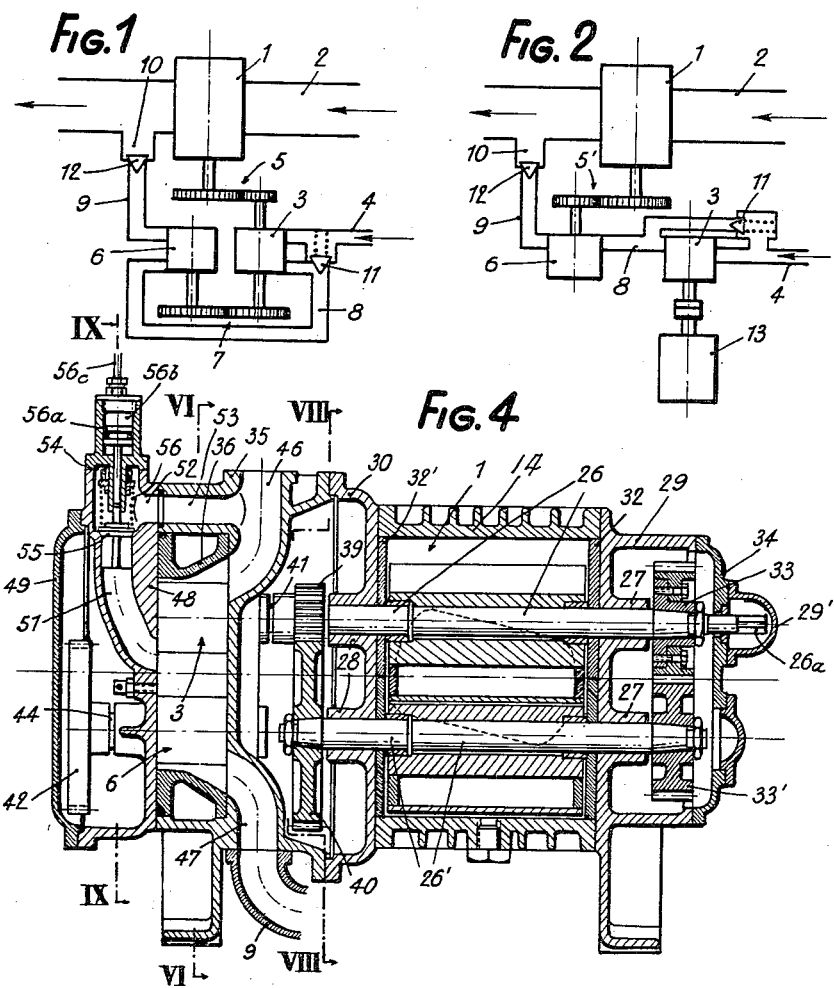
INVENTOR:
LOUIS RENÉ CORVISIER
By
Richardson, David and Nardon
ATTY'S.

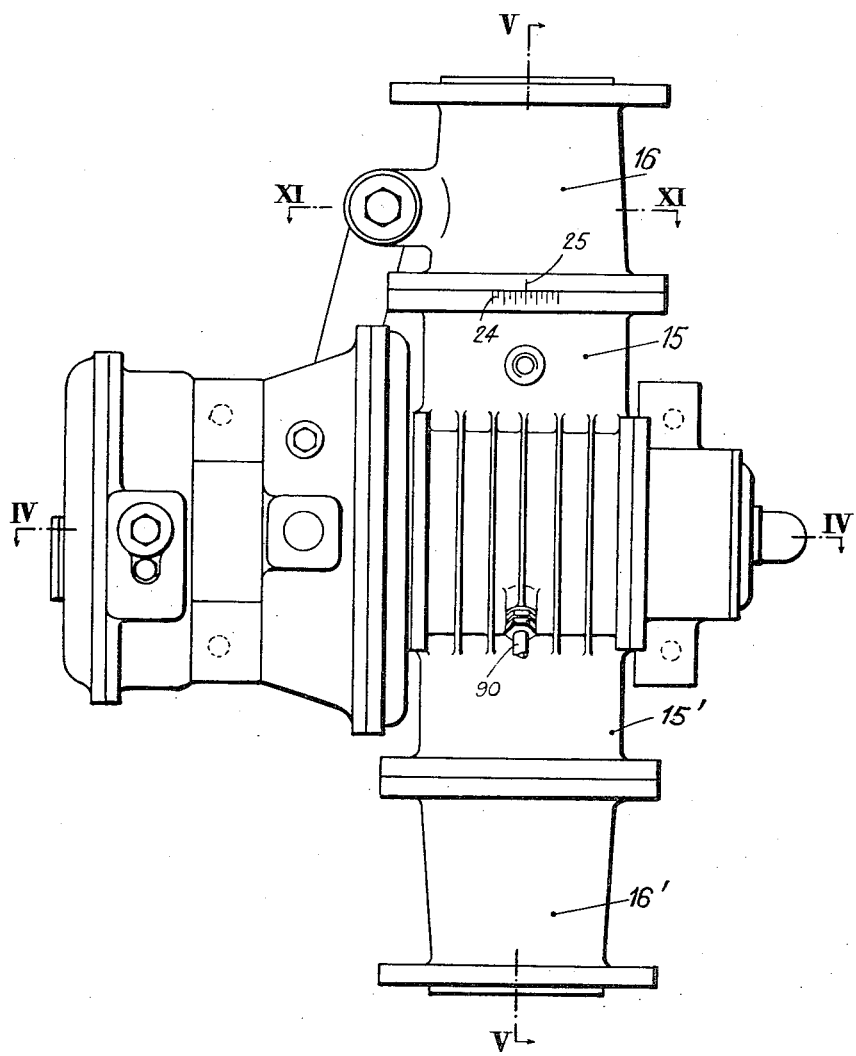

Sept. 18, 1962 L. R. CORVISIER 3,054,417
APPARATUS FOR MIXING LIQUIDS IN A CONSTANT PROPORTION
Filed May 6, 1957 6 Sheets-Sheet 3
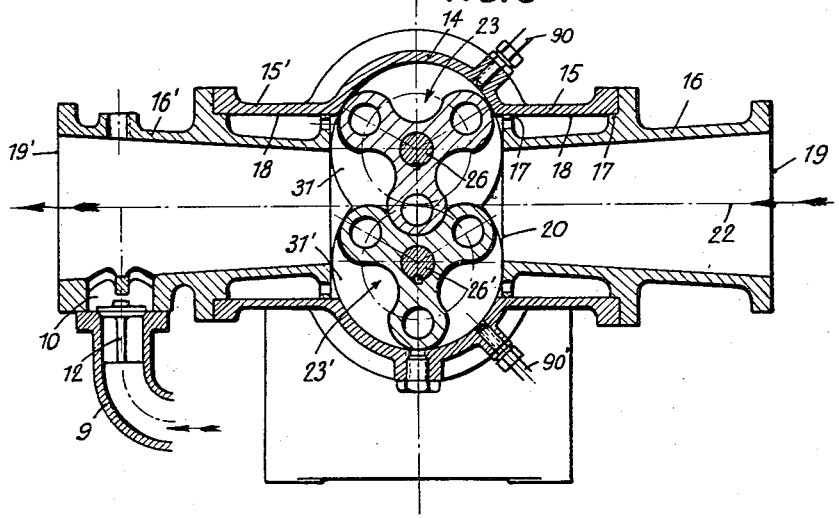
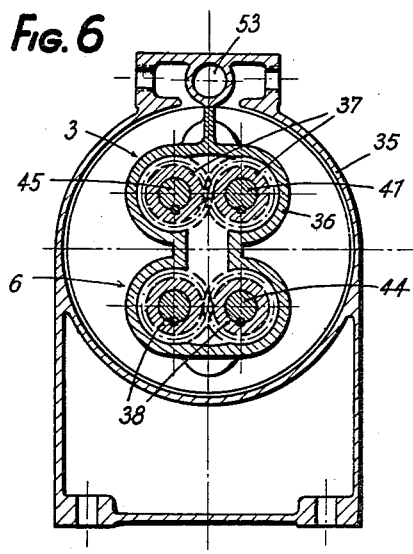
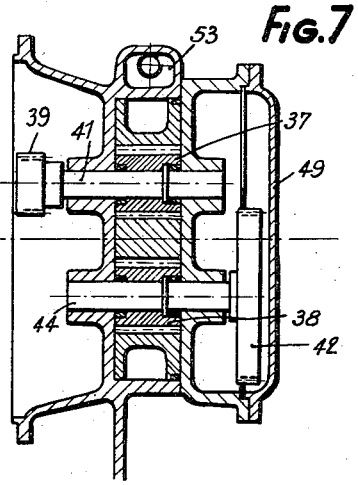
INVENTOR:
LOUIS RENÉ CORVISIER
by
Richardson, David and Nordon
ATTY'S.

Sept. 18, 1962 　　L. R. CORVISIER　　3,054,417
APPARATUS FOR MIXING LIQUIDS IN A CONSTANT PROPORTION
Filed May 6, 1957　　6 Sheets-Sheet 4

INVENTOR:
LOUIS RENÉ CORVISIER
By
Richardson, David and Nerdon
ATTY'S.

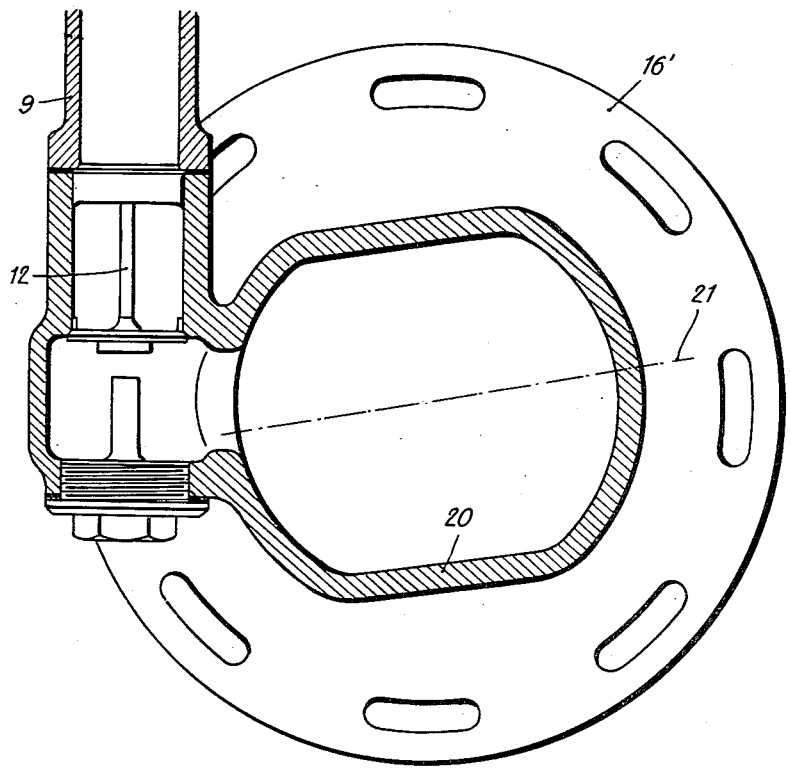

Sept. 18, 1962   L. R. CORVISIER   3,054,417
APPARATUS FOR MIXING LIQUIDS IN A CONSTANT PROPORTION
Filed May 6, 1957   6 Sheets-Sheet 6
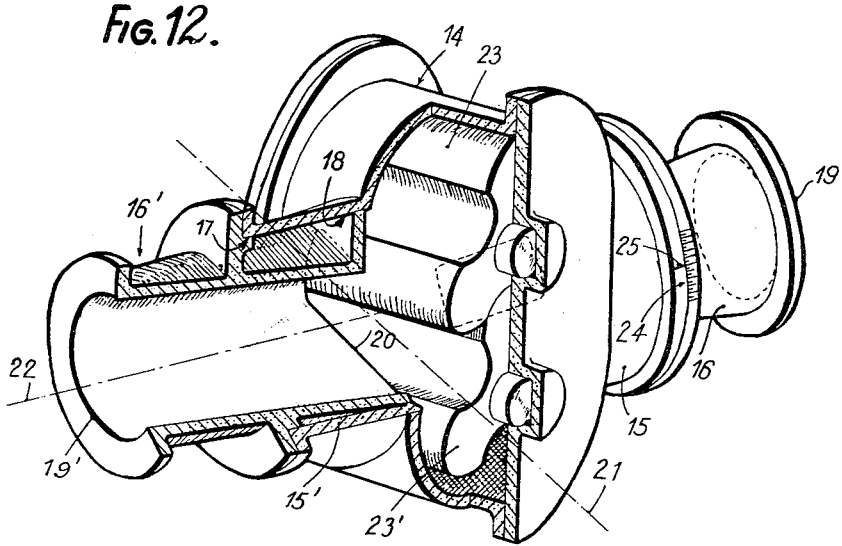
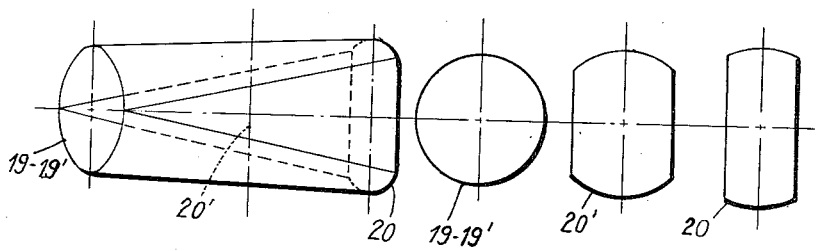
INVENTOR:
LOUIS RENÉ CORVISIER
By
Richardson, David and Nordon
ATTY'S.

United States Patent Office 3,054,417
Patented Sept. 18, 1962

3,054,417
APPARATUS FOR MIXING LIQUIDS IN A
CONSTANT PROPORTION
Louis René Corvisier, 9 Rue du General Laperrine,
Paris, France
Filed May 6, 1957, Ser. No. 657,252
Claims priority, application France May 7, 1956
9 Claims. (Cl. 137—99)

This invention relates essentially to a method for obtaining in a hydraulic circuit or duct a mixture of liquids under variable output or pressure conditions while keeping the proportion of said liquids to a constant value.

Mixtures of this character are required for example in the case of fire-engines employing a foamy liquid which is to be mixed in predetermined invariable proportions with a main liquid and subsequently delivered under pressure to the jet nozzles. In this case the output of the apparatus and the pressure of the projected liquid may vary to a substantial extent according to the number of nozzles utilized and nevertheless it is necessary, irrespective of the rate of operation, to keep the proportion of the projected final mixture components to a constant value.

It is known, for example in the case of a mixture comprising essentially a main, variable-output liquid and a secondary liquid, to use a metering pump actuated by a hydraulic motor or the like connected to the duct feeding the main liquid so as to deliver the secondary liquid into the stream of main liquid with a pressure varying as a function of the output of the main liquid in its feed pipe. However, apparatus operating according to this principle have the serious drawback of affording a constant proportion of the constituents in the mixture only within a relatively narrow range of operating speeds or output ratings, for under low-output conditions the losses of pressure in the hydraulic engine and in the metering pump become too important and reduce to a considerable degree the feed pressure of the metering pump which may thus become unable to deliver the desired proportion of secondary liquid.

Now it is the essential object of this invention to provide a method whereby this inconvenience is avoided and which is remarkable notably in that it consists in injecting in the variable-output circuit of a main constituent of the mixture the secondary liquid or liquids of said mixture by means of one or more metering pumps driven or rotatably controlled by the flow of said main constituent, and providing one or more additional pumps adapted to supply said metering pump or pumps with a feed pressure sufficient to enable said metering pump or pumps to maintain the aforesaid constant proportion at different rates of flow of the main constituent.

With these additional pumps it is thus possible to accurately compensate for the pressure drops taking place on the suction side of the metering pump or pumps, particularly at low speeds, and to ensure a constant proportion of the component elements of the mixture irrespective of the pressure or output of the main liquid or of the projected final mixture.

The aforesaid additional pumps may be driven either from a hydraulic prime mover motor or the like which is controlled by the flow of the main constituent, or from a separate engine motor or the like, for example an electric, constant-speed motor. In these different cases limiting means such as valves or the like are preferably provided on the delivery circuit of the secondary liquid or liquids or on a branch of said circuit in view of limiting to the desired value the pressure of said secondary liquid or liquids which is or are injected into and mixed with the main constituent.

To obtain a constant proportion of the output of the secondary liquid or liquids in the main liquid it is necessary that the additional pump associated with a metering pump having predetermined characteristics delivers a greater output than this metering pump so as to supply same with a sufficient feed pressure irrespective of the speed of operation.

This invention is also concerned with a metering and mixing device whereby a mixture of variable-output liquids may be obtained in a pipe or hydraulic circuit according to the method broadly set forth hereinabove, wherein said liquids have constant proportions, this device being remarkable notably in that it comprises in combination at least one hydraulic engine driven from the flow of one constituent of the mixture in a main duct, a proportioning or metering pump driven from said hydraulic engine and adapted to draw one or more secondary liquids and to deliver same into said main duct, and an additional pump interposed in the feed circuit of said metering pump, said additional pump being adapted to feed said metering pump with a delivery pressure sufficient to enable said metering pump to constantly proportion the secondary liquid of the mixture for different rates of flow of the main constituent.

A device of this general character may be provided for delivering variable-output mixtures incorporating any desired number of liquid constituents and be used in the most diversified applications.

Preferably, this device is embodied in the form of an apparatus having relatively small over-all dimensions which may be easily shipped and transported. For this purpose, in the case for example of a device comprising only one metering pump and one additional pump, it is possible to drive these pumps from a single hydraulic motor or the like which is operatively connected to the main liquid feed duct and construct a compact unit containing the kinematic gear train providing the different transmission ratios required for driving said pumps from the hydraulic motor with a predetermined speed ratio.

Other features and advantages of the invention will appear as the following description proceeds with reference to the attached drawings forming part of this specification and illustrating diagrammatically by way of example a few embodiments of the invention. In the drawings:

FIGURE 1 is a diagram illustrating the principle of operation of a metering and mixing device made in accordance with the teachings of this invention;

FIGURE 2 is a similar diagram of a modified embodiment of the device of FIG. 1;

FIGURE 3 is a plan view from above showing a metering and mixing device constructed in accordance with the teachings of this invention;

FIGURE 4 is a longitudinal section taken upon the line V—V of FIG. 3;

FIGURE 5 is a cross section taken upon the line V—V of FIG. 3;

FIGURE 6 is a section taken upon the line VI—VI of FIG. 4;

FIGURE 7 is a fragmentary longitudinal section of FIG. 3 showing the metering pump and the additional pump;

FIGURE 11 is a section taken upon the line XI—XI of FIG. 3;

FIGURE 12 is a perspective view with parts broken away showing the hydraulic motor of the apparatus;

FIGURE 13 is a diagram showing a sleeve of the hydraulic motor connecting device; and FIGURES 14 to 16 illustrate diagrammatically the cross-sectional shape of this sleeve at its ends and in its intermediate portion.

Figure 8:
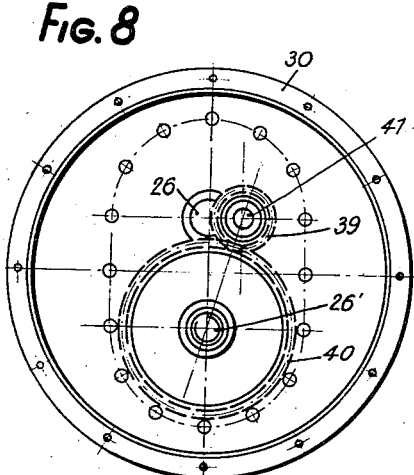
FIGURE 8 is a cross section taken upon the line VIII—VIII of FIG. 4.

In the typical example shown in FIG. 1, a metering and mixing device adapted to mix a main liquid with a secondary liquid in fixed or constant relative proportions comprises a hydraulic motor or the like 1 inserted in the pipe 2 feeding the main liquid, an additional pump 3 inserted in the pipe 4 feeding the secondary liquid and rotatably driven from the hydraulic motor 1 through intermediate gears 5, and a proportioning or metering pump 6 driven from the additional pump 3 through a pair of intermediate gears 7. This metering pump 6 is fed with secondary liquid through a pipe 8 from the additional pump 3, its delivery pipe 9 opening at 10 in the input pipe 2 for the main liquid.

The delivery pipe 8 of the additional pump 3 communicates with the secondary liquid feed pipe 4 through a limit valve 11 adapted to reduce to the desired value the feed pressure of the proportioning or metering pump 6. On the other hand, a non-return valve 12 is provided between the delivery pipe 9 of the metering pump 6 and the main liquid feed pipe 2.

Thus, it will be seen that due to the provision of the gears 5 and 7 the hydraulic motor, the speed of which varies according to the output of main liquid through the pipe 2, drives in turn with constant ratios the pumps 3 and 6 which, if they have a sufficient feed pressure, will deliver an output proportional to that of the main liquid. To this end the pumps 3 and 6 are so designed that the former, irrespective of its speed of operation, will deliver a greater output than the latter and apply thereto a feed pressure sufficient to keep the output of the secondary liquid pump 6 strictly proportional to the main liquid output in the pipe 2.

To obtain this condition the pumps 3 and 6 may have different operating characteristics while being driven at the same speed or, according to a modified embodiment, these pumps may be of same design but driven at different speeds through gears providing the suitable speed ratios.

According to the modified embodiment shown in FIG. 2, the additional pump 3 is driven for rotation from a separate electro-motor 13 and the metering pump 6 is rotatably driven from the hydraulic motor 1 through a pair of gears 5'.

According to a further possible embodiment of this invention the additional pump 3 may be driven from a small hydraulic motor actuated by the main liquid and interposed to this end on a branch section of pipe 2.

The apparatus illustrated in FIGS. 3 and 4 of the drawings operate according to the principle of the device shown in FIG. 1. The hydraulic motor 1 is enclosed in a case 14 provided for example with lateral flanges 15, 15' in which are mounted sleeve members 16, 16' through which this case 14 may be connected to the main liquid input pipe. These sleeve members are provided with cylindrical outer shoulders 17 adapted to be journalled in the internal cylindrical wall 18 of the flanges 15 and 15'. Preferably, the sleeve members 16, 16' have an evolutive-shaped inner cross-section, their outer faces 19, 19' opposite to the body of the hydraulic motor having for example a circular cross-section (see FIG. 14) whereas the faces through which they open inside the case 14 have a substantially rectangular cross-section 20 (see FIGS. 11 and 16). Their intermediate cross-section as shown at 20' in FIG. 15 is of a shape intermediate those of the circular and rectangular end cross-sections. Of course, this cross-section 20 may have a substantially different shape, such as oval, elliptic, etc. or comprise in general a main axis 21 whereby the stream of liquid flowing into the case 14 will have a more or less flattened cross-section. With this arrangement, by pivoting the sleeve members 16, 16' inside the cylindrical wall 18 of flanges 15, 15' about the axis 22 (see FIG. 6), it is possible to adjust the position of the main axis 21 of sections 20 relative to the rotary members 23, 23' of the hydraulic motor and provide a variable helical feed pitch for the main liquid relative to these rotary members, as well as variable input and output angles of the liquid stream relative to the same rotary members.

An accurate adjustment of the liquid feed pitch may be effected by means of a scale 24 registering with a reference mark or line 25, the scale 24 and line 25 being carried for example by external faces provided on the flange 15 and sleeve member 16, respectively, so that the force with which the rotary members are carried along by the liquid may be altered at will and therefore the velocity of rotation of these members for a given output of the main liquid in the hydraulic motor may also be modified at will.

Of course, only one of the sleeve members 16, 16' is adjustable, if desired, the other being stationary. Moreover, the adjustment of these sleeve members may be carried out through different means. Thus, these sleeve members may be operatively connected to the case 14 through rod linkage means, ball-and-socket joints, or the like, whereby either these sleeve members may be directed in a longitudinal plane, or in general the angle which results between the fluid stream entering or issuing from the apparatus and the axis of rotation of the rotary members of the leading faces or edges of the blades, buckets or the like of these same rotary members may be altered at will.

The inner cross-section of these sleeve members may be either evolutive to impart a helical feed pitch to the fluid stream, or constant, conical, etc.

It is evident that the connecting device described hereinabove is applicable to apparatus of any description such as pumps, fans, turbines, hydraulic motors, etc. which comprise rotating or sliding driving members, such as wheels, pistons, etc. Moreover, the sleeve members may be adjusted either manually or automatically through a centrifugal regulator, a servo-mechanism, a hydraulic control, or any other control means whereby the angular position of the sleeve members may be altered automatically as a function either of the velocity of flow of the fluid, or of the velocity of rotation of the driving member or the like.

The rotary members 23, 23' may consist of paddle-wheels, vane-cylinders or the like which mesh with each other according to the well-known principle. In the selected example they consist of two lobed wheels or cylinders (see FIGS. 4 and 5) mounted on a pair of parallel shafts 26, 26' journalled at their ends in bearings 27, 28 provide in two end plates or auxiliary cases 29, 30 closing laterally the case 14 of the hydraulic motor, respectively. Preferably, the outer diameter of the theoretical cross-section of these wheels is slightly greater than the inner diameter of the cylinder cavities 31, 31' of the case 14 in which they are mounted so as to contact the inner wall of these cavities through very small flat portions formed on the outer peripheral surface of each lobe in view of providing the necessary fluid tightness during the operation of the device.

A projecting, splined end 26a may be provided on the shaft 26 for rotatably driving the mechanism by means of a crank when necessary, access to this splined shaft end being gained by removing the end cover 29' closing the case 29 registering with this projecting shaft end.

Centering flanges 32, 32' are mounted inside the case 14 on either side of the wheels 23, 23'. At one of their ends the shafts 26, 26' carry synchronizing gears 33, 33' meshing with each other and located inside the case 29. The reference number 34 designates the closing cover of case 29.

Figure 9:
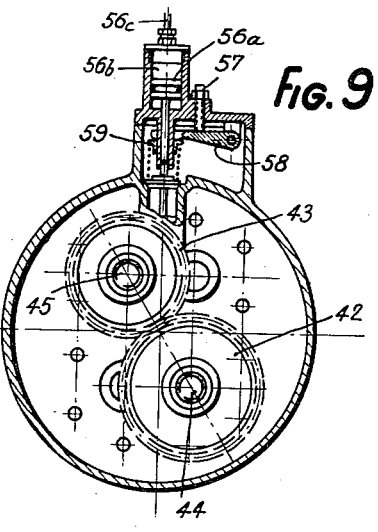
FIGURE 9 is a cross section taken upon the line IX—IX of FIG. 4.
Figure 10:
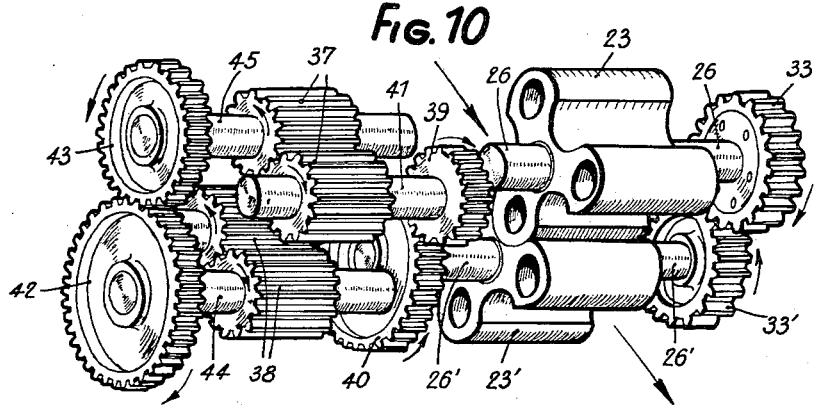
FIG. 10 is a perspective view showing the complete transmission for driving the metering pump and its additional pump from the same hydraulic motor.

The flanged case 30 has secured thereon another case 35 enclosing the additional pump 3 and the proportioning or metering pump 6. This case 35 comprises for example another internal case 36 the inner volume of which constitutes a double pumping chamber in which there are pivotally mounted on the one hand a pair of spur gears 37 constituting the pump 3 and on the other hand a pair of spur gears 38 constituting the pump 6. One of the gears 37 of the additional pump 3 is rotatably driven from the lobed wheel 23' through a pair of pinions 39, 40, pinion 40 being keyed on the end of shaft 26' of lobed wheel 23', and pinion 39 being on the shaft 41 of one of the gears 37. On the other hand, the metering pump 6 is driven for rotation from the additional pump 3 through a pair of pinions 42, 43 (see FIGS. 9 and 10) wedged the former on the shaft of one of the gears 38 of the metering pump 6 and the latter on the shaft 45 of one of the gears 37 of the additional pump 3. The complete kinematic transmission thus constituted by the different synchronizing gears and the gears driving the lobed wheels 23, 23' of the hydraulic motor and of the gear wheels of the two pumps 3 and 6 is clearly illustrated in FIG. 10.

The cases 35 and 36 of pumps 3 and 6 are provided for example, with a common suction inlet 46 adapted to be connected to the input duct or pipe 4 for the secondary liquid and also with a delivery inlet 47 connected at 10 (see FIG. 4) through the pipe 9 to the end of the output sleeve 16' (see FIG. 5) of case 14 of the hydraulic motor where a non-return valve 12 is provided, this valve consisting for example of a simple gravity-operated mushroom valve.

The casing assembly 35, 36 is closed by a case member 48 and a cover 49. The case member 48 comprises a pair of internal passages 51, 52 opening the former into the pumping chamber of pump 3, on the delivery side thereof, and the latter into a passage 53 formed in the case 35 leading in turn into the suction inlet 46. Both passages 51 and 52 open into a chamber 54 formed in the upper portion of the case member 48 on either side of a valve 55 so mounted as to be urged by a calibrated spring 56 against a seat formed internally of the passage 51, as shown in FIG. 4. The shank of valve 55 is so mounted that its stroke is limited by the shank of a piston 56a slidably mounted in a chamber 56b communicating through its upper portion and a pipe 56c with the main liquid feed duct. With regard to the shank of said valve 55 the shank of the piston 56a acts as an abutment means responsive to the pressure of the main liquid. This connection of the pipe 56c may be positioned either upstream or downstream relative to the hydraulic motor.

It is apparent that, with this arrangement, the valve 55 has the same function as the limiting valve 11 of the preceding diagrammatic example and controls the communication between the passages 51 and 53, when the pressure exerted by the secondary liquid on the valve head 55 exceeds the pressure exerted by the main liquid on the piston 56a plus the spring force plus the the mechanical friction, the valve moves upwards, a circulation of the secondary fluid takes place in the passages 51 and 53 over the normal circulation in the pumps 3 and 6. On the contrary, when the pressure exerted by the secondary liquid is lower than the pressure on the piston plus the spring force plus the mechanical frictions, the valve is closed and the secondary liquid solely runs through the pumps 3 and 6. As a result, the pressure at which the fluid is delivered by the additional pump 3 to the pump 6 is constantly regulated, due to the provision of this valve 55. The portion of the liquid which does not run through the passages 51 and 53 passes through the additional pump. This pressure may be modified by regulating the force of the antagonistic spring 56, for example in the manner illustrated in FIG. 9 by means of an adjustment screw 57 acting on a lever 58, the latter being so arranged that any change brought in its position will modify the spring length by altering the position of an intermediate socket 59 engaged by one end of this spring.

In an apparatus of this character the percentage of secondary liquid delivered into the stream of main liquid may be changed by simply changing the gearing controlling the metering pump 6.

Of course, the invention is not limited to the few embodiments shown and described herein, as many modification may be brought thereto without departing from the spirit and scope of the invention as set forth in the appended claims.

What I claim is:

1. Metering and mixing device for producing a mixture of liquids under variable output conditions wherein said liquids are a main liquid and at least a secondary liquid mixed in constant relative proportions comprising at least a hydraulic motor driven by the flow of said main liquid through a main duct, a metering pump driven from said hydraulic motor, the inlet of said metering pump being supplied with said secondary liquid while its outlet is connected to said main duct by means of a delivery pipe provided with a non-return valve, an additional pump power-connected with said hydraulic motor and inserted in the supply circuit of said metering pump, the characteristics of said additional pump being so provided that its output is greater than that of said metering pump, and a by-pass circuit between the inlet and the outlet of said additional pump, said by-pass circuit having a limit valve provided with a shank and submitted to the action of a calibrated spring so mounted as to urge said valve against its seat, said by-pass circuit comprising moreover means responsive to the pressure of said main liquid and provided for butting against said shank, whereby the motion of said limit-valve under the pressure exerted by said secondary liquid is controlled by the pressure of said main liquid.

2. Device as claimed in claim 1 wherein said additional pump is power-connected with said hydraulic motor by means of a gear train, and wherein said metering pump is power-connected in turn with said additional pump by means of a further gear train.

3. Device as claimed in claim 1 wherein said means responsive to the pressure of said main liquid consist of a piston slidably mounted in a chamber communicating through a pipe with said main duct, said piston having a rod provided to act as a movable stop cooperating with said shank.

4. Device as claimed in claim 3 wherein one end of said calibrated spring butts against a slidable intermediate socket, a rotatable lever, submitted to the action of an adjustment screw, butting against said socket whereby the force of the calibrated spring is adjustable by means of said adjustment screw.

5. Device as claimed in claim 1 wherein said metering pump and said additional pump are of the gear type.

6. Device as claimed in claim 1 wherein said hydraulic motor is connected to said main duct through sleeve means, the direction of which and consequently the direction of flow of the stream of liquid, is adjustable both at the inlet and at the outlet of said hydraulic motor relative to the direction of the axis of rotation of said hydraulic motor.

7. Device as claimed in claim 6 wherein said sleeve means have an evolutive internal cross-section; their ends remotest from the hydraulic motor having a circular cross-section, the ends through which said sleeve means lead into said hydraulic motor having a substantially rectangular cross-section.

8. Device as claimed in claim 7 wherein said sleeve means are manually adjusted.

9. Device as claimed in claim 7 wherein said sleeve means are adjusted through control means responsive either to the velocity of flow of the stream of liquid or to the velocity of rotation of said hydraulic motor.

References Cited in the file of this patent

UNITED STATES PATENTS 1,076,299     Marshall _____ Oct. 21, 1913

(Other references on following page)

UNITED STATES PATENTS

| | | |
|---|---|---|
| 1,110,123 | Feller | Sept. 8, 1914 |
| 1,720,326 | Halstead et al. | July 9, 1929 |
| 1,952,882 | Morgan | Mar. 27, 1934 |
| 1,999,881 | Lowe | Apr. 30, 1935 |
| 2,117,789 | Cleary | May 17, 1938 |
| 2,543,941 | Sargent | Mar. 6, 1951 |
| 2,556,583 | Hinz | June 12, 1951 |
| 2,599,680 | Weeks | June 10, 1952 |
| 2,696,266 | Tuve | Dec. 7, 1954 |
| 2,870,776 | Marsh | Jan. 26, 1957 |